May 26, 1931.  C. W. WAAS  1,806,961
CHILD'S WAGON
Filed Oct. 17, 1929   2 Sheets-Sheet 2
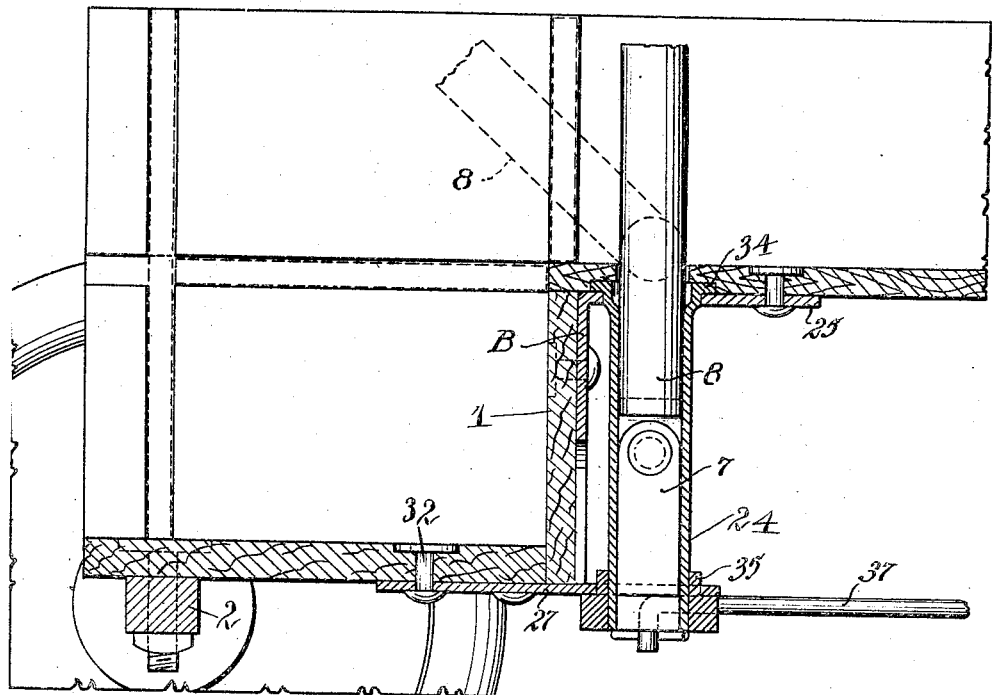
INVENTOR
Charles W. Waas.
BY
ATTORNEY Patented May 26, 1931

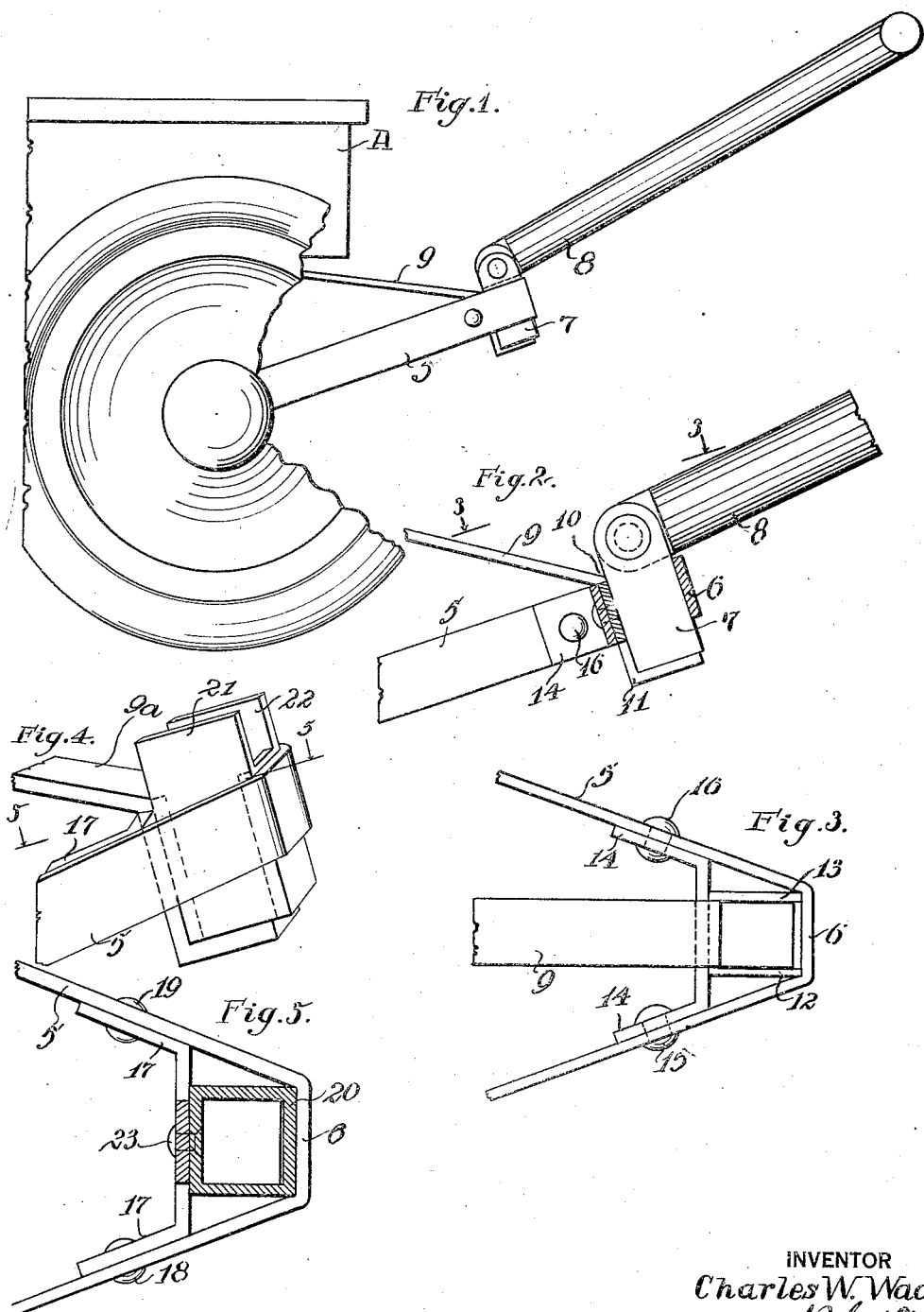

1,806,961

UNITED STATES PATENT OFFICE

CHARLES W. WAAS, OF ST. PAUL, MINNESOTA

CHILD'S WAGON

Application filed October 17, 1929. Serial No. 400,388.

The present invention relates to an improvement in a child's wagon, and more particularly to a handle and steering mechanism for the type of wagon described in my copending application, Serial Number 385,790, filed August 14, 1929.

An object of the present invention is to make a child's wagon and an improved handle and steering mechanism therefor.

In order to attain this object, there is provided, in accordance with one feature of the invention, a folding handle having a squared lower portion with a socket supported by means of a framework from the front axle of the wagon, and a second socket fixedly connected to a pivotally supported cross arm mounted near the rear end of the wagon, said cross arm being connected by means of links to the front axle of the wagon.

These and other features of the invention will be more fully brought out in the following description and the accompanying drawings, wherein:

Figure 1 is a view in side elevation of the front end and handle portion of a wagon made in accordance with the present invention, a portion of the front wheel being broken away.

Figure 2 is a sectional view through the framework of a handle extension, showing the handle in side elevation in the socket provided therefor in said extension.

Figure 3 is a view in top elevation of Figure 2.

Figure 4 is a view in perspective of a modified form of handle socket.

Figure 5 is a sectional view on the line 5—5 of Figure 4.

Figure 6 is a view in vertical longitudinal section through the rear portion of the wagon, showing a method of mounting the handle for steering from the rear portion of the wagon.

Figure 7 is a view in perspective of a sheet metal member for supporting the rear steering member; and Figure 8 is a view in perspective showing the under surface of the wagon and the steering mechanism of the wagon, the two right hand wheels being removed to more clearly show the steering mechanism.

Referring to the drawings in detail, a coaster wagon comprises a box portion A with the rear end thereof dropped downwardly as at 1 to permit a child to stand in this rear portion and propel the vehicle with one foot, while the other is resting in this depressed rear portion of the wagon box. A rear axle 2 is connected directly to the under side of this depressed rear portion. A front axle 3 may be provided with an inverted V-shaped member 4 mounted on the upper side thereof, the upper end of said V-shaped portion being flattened and pivotally supported to the under side of the forward portion of the wagon box.

A second V-shaped member 5 is connected to the forward side of the front axle to extend forwardly therefrom, the apex of this member being also flattened as at 6 to accommodate a box-like housing for seating the squared, lower end 7 of a handle 8. A bracing member 9 is extended from the apex of the member 4 to the apex of the member 5 to rigidly connect these members.

One method of forming this box-like housing is shown in the first three figures, the forward end of the member 9 being bent downwardly as at 10 and then forwardly at right angles as at 11 to form a lower support for the squared lower end portion 7 of the handle. Two ears 12 and 13 project laterally from the vertical portion 10 of the member 9 and are bent to lie at right angles with the vertical portion 10 of the member 9 to form, with the portion 6 of the member 5, a squared, box-like housing. A bracing member 14 extends transversely just in rear of the box-like housing formed in this manner, the end portions of this transverse bracing member being bent to lie against the inner sides of the member 5, being rigidly secured thereto as by means of rivets 15 and 16.

A second form of box-like housing is shown in Figures 4 and 5. In this construction the V-shaped member 5 is similar to that shown in the first three figures. The forwardly extending member 9a, however, corresponding to the member 9 in the first three figures, has ears 17 projecting from the sides thereof, which form a transverse bracing means corresponding to that supplied by the member 14 in the first three figures. This transverse bracing member is secured to the inner sides of the V-shaped member 5 as by means of rivets 18 and 19. A squared housing member may be formed of a piece of square tubing 20 with upwardly extending ears 21 and 22 on the sides thereof to give additional support to the handle member. The square housing is secured to the member 9a as by means of a rivet 23.

Just forwardly of the step 1 between the normal wagon bottom and the depressed rear portion thereof, is provided a support for a pivotally mounted squared housing 24 to receive the squared lower end of the steering handle. In the present instance this support comprises a metal stamping B having a horizontal upper portion 25 which is secured to the lower surface of the bottom of the forward portion of the wagon box, a vertical portion 26 which is secured to the vertical step portion 1 of the wagon box, and a second horizontal portion 27 which is secured to the under side of the bottom board of the depressed rear portion of the wagon box. A forwardly projecting portion 28 is provided by cutting this portion out of the metal of the sheet as at 29 and bending it to lie in the same plane as the lower horizontal portion 27. An opening 30 is provided in this forwardly extending portion 28 and a second opening 31 is cut in the upper horizontal portion 25 in vertical alinement with the opening 30. This member B is secured in place by means of rivets 32 and in addition to supporting the square tube 24 acts as a bracket to brace this portion of the wagon. The square housing 24 which may be of square, tubular material is constructed with an enlarged upper end as at 34, the portion just below this flange being rounded out to fit within the circular opening 31 to pivot therein. A circular opening is provided in the floor of the wagon box through which the handle 8 may be inserted into the square tube 24, the opening being undercut to receive a flange 34 on the upper end of the member 24. A bushing 35 is provided with a square central opening to receive the square tube 24 therein and is fixedly secured to the lower end of the square tube in a desired manner. This member is provided with a circular portion which is mounted in the circular opening 30 to pivot therein. An arm 36 is fixedly connected to this member and is provided with openings in the outer ends thereof to receive rods 37 and 38 which are connected to the forward axle of the wagon. These rods are preferably bent inwardly at their centers to increase the turning angle of the front wheels. This bending of the rods inwardly increases the distance from the tires of the front wheels of the wagon to the rods 37 and 38 and thereby permits the front axle to be turned to a greater angle on its pivot before the wheels engage the rods than would be the case were these rods straight.

The handle comprises a squared lower portion 7 which is of a size to fit into the squared, box-like housing on the extension from the front axle and into the square tube 24. Hingedly connected to the upper end of this portion is a handle 8 which may be round and of a diameter not greater than the width of the squared lower end of the handle so that a portion of this upper end of the handle may be inserted into the square tube 24, as illustrated in Figure 6. The handle may be inserted into the square tube the entire length of said tube, as illustrated in solid lines in Figure 6, or it may be inserted merely the length of the squared lower portion thereof, in which position the upper end of the handle may be moved angularly rearward, as indicated in dotted lines in Figure 6, so that a child may operate the vehicle with the handle in either position.

The construction of the forward extension from the front axle and the mounting of the handle in the square, box-like housing provided therein, provides a handle which is strong and rigid and which will resist pull in all directions except upwardly and rearwardly in line with the side walls of the housing. The handle may be moved by pulling it upwardly and rearwardly in such direct line with the side walls of the housing, and may then be readily inserted into the square tube 24 in which position the wagon may be readily steered by the child from the rear end of said wagon.

I claim:

1. In a child's wagon, a steering mechanism comprising a forwardly extending frame connected to the front axle to turn therewith, a squared housing in the forward end of said extension, a rotatable member mounted rearwardly of said front axle and having laterally extending arms connected thereto, said rotatable member having a squared opening therein, link means connecting the laterally extending arms connected to said member to the front axle and a handle member having a squared lower end and an upper portion hingedly connected thereto, said squared lower portion being of a size to fit closely in the squared housing on the forward extension of the front axle and to fit within the squared opening in said rotatable member.

2. In a child's wagon, a steering mechanism comprising a forwardly extending frame connected to the front axle, a socket fixedly mounted with its axis substantially vertical in said frame, a handle having the lower portion thereof hingedly connected to the upper portion thereof, said lower portion being adapted to slidably enter said socket to turn therewith, a tubular member pivotally mounted rearwardly of said front axle and adapted to receive the lower portion of said handle to turn therewith, and means operatively connecting said tubular member to said front axle to turn said front axle with said tubular member.

3. In a child's wagon having a body with a depressed rear portion, a forwardly extending frame connected to the front axle thereof, said frame having a socket therein, a handle having an end adapted to enter said socket to rotate therewith, a bracing member connected at the offset between the front and rear body portions and having a pair of vertically alined openings therein, a tubular member having a central opening mounted for rotation in said alined openings, and adapted to receive said handle and rotate therewith, and means operatively connecting said tubular member and said front axle to turn said front axle with said tubular member.

In testimony whereof I affix my signature.

CHARLES W. WAAS.